US012150193B2

(12) United States Patent
Wu et al.

(10) Patent No.: US 12,150,193 B2
(45) Date of Patent: Nov. 19, 2024

(54) METHOD AND APPARATUS FOR HANDLING CONNECTION WITH MULTI-SIM

(71) Applicant: LENOVO (BEIJING) LIMITED, Beijing (CN)

(72) Inventors: Lianhai Wu, Beijing (CN); Genadi Velev, Darmstadt (DE); Jing Han, Beijing (CN); Haiming Wang, Beijing (CN); Jie Shi, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 108 days.

(21) Appl. No.: 17/616,360

(22) PCT Filed: Jun. 12, 2019

(86) PCT No.: PCT/CN2019/090989
§ 371 (c)(1),
(2) Date: Dec. 3, 2021

(87) PCT Pub. No.: WO2020/248175
PCT Pub. Date: Dec. 17, 2020

(65) Prior Publication Data
US 2022/0256630 A1    Aug. 11, 2022

(51) Int. Cl.
*H04W 76/15*    (2018.01)
*H04W 88/06*    (2009.01)

(52) U.S. Cl.
CPC .......... *H04W 76/15* (2018.02); *H04W 88/06* (2013.01)

(58) Field of Classification Search
CPC ..... H04W 88/06; H04W 24/08; H04W 76/10; H04W 76/30; H04W 60/005;
(Continued)

(56) References Cited

U.S. PATENT DOCUMENTS 9,674,758 B2    6/2017    Tsai et al.
10,863,565 B2 *  12/2020    Lindoff ................. H04W 8/183
(Continued)

FOREIGN PATENT DOCUMENTS

| CN | 102014484 A |   | 4/2011 |            |
|----|-------------|---|--------|------------|
| CN | 105530024 A |   | 4/2016 |            |
| CN | 115066938 A | * | 9/2022 | ........... H04W 68/00 |

OTHER PUBLICATIONS

S. Wu, P. L. Yeoh, W. Hardjawana and B. Vucetic, "Identifying Security and Privacy Vulnerabilities in 4G LTE and IoT Communications Networks," 2021 IEEE 7th World Forum on Internet of Things (WF-IoT), New Orleans, LA, USA, 2021, pp. 512-517, doi: 10.1109/WF-IoT51360.2021.9595689. (Year: 2021).*
(Continued)

*Primary Examiner* — William D Cumming
(74) *Attorney, Agent, or Firm* — Kunzler Bean & Adamson

(57) ABSTRACT

One method includes: communicating with a first base station by utilizing a first SIM and communicating with a second base station by utilizing a second SIM; transmitting a request signal to the second base station in response to a connection setup process between the user equipment and the first base station; and receiving a configuration message from the second base station in response to the request signal.

16 Claims, 10 Drawing Sheets

(58) Field of Classification Search
CPC ..... H04W 64/00; H04W 12/45; H04W 12/02; H04W 8/183; H04W 58/00; H04W 76/15; H04W 25/0229; H04W 68/00; H04W 68/02; H04W 68/005; H04W 72/23; H04W 52/0229
USPC .......................................................... 455/437
See application file for complete search history.

(56) References Cited

U.S. PATENT DOCUMENTS

| | | | |
|---|---|---|---|
| 10,917,786 B2 * | 2/2021 | Ryoo | H04W 52/0229 |
| 11,272,352 B2 * | 3/2022 | Choi | H04W 12/45 |
| 11,582,603 B2 * | 2/2023 | Ryoo | H04W 76/30 |
| 11,832,336 B2 * | 11/2023 | Agarwal | H04W 76/30 |
| 2013/0065570 A1 | 3/2013 | Jung et al. | |
| 2014/0220981 A1 * | 8/2014 | Jheng | H04W 88/06 455/437 |
| 2015/0126187 A1 | 5/2015 | Ponukumati et al. | |
| 2016/0112084 A1 | 4/2016 | Parron et al. | |
| 2016/0309379 A1 * | 10/2016 | Pelletier | H04W 76/15 |
| 2018/0084504 A1 * | 3/2018 | Lindoff | H04B 17/336 |
| 2018/0160422 A1 * | 6/2018 | Pathak | H04W 76/10 |
| 2019/0191483 A1 * | 6/2019 | Ryoo | H04W 52/0229 |
| 2019/0320488 A1 * | 10/2019 | Mildh | H04W 68/005 |
| 2020/0053830 A1 * | 2/2020 | Venkataraman | H04W 68/12 |
| 2020/0084814 A1 * | 3/2020 | Lindoff | H04W 64/00 |
| 2020/0196273 A1 * | 6/2020 | Ozturk | H04W 68/02 |
| 2020/0382942 A1 * | 12/2020 | Choi | H04W 12/45 |
| 2021/0168603 A1 * | 6/2021 | Ryoo | H04W 76/10 |
| 2022/0159451 A1 * | 5/2022 | Choi | H04W 12/02 |
| 2022/0225276 A1 * | 7/2022 | Xu | H04W 68/02 |
| 2023/0119395 A1 * | 4/2023 | Agarwal | H04W 56/001 370/329 |

OTHER PUBLICATIONS

CATT, RNA update, 3GPP TSG-RAN WG3 NR#98, R3-174333, Nov. 27- Dec. 1, 2017, pp. 1-4, Reno, NV, USA.

Intel Corporation, Intel Views on RELEASE-17, 3GPP TSG RAN Meeting #84, RP-191406, Jun. 3-6, 2019, pp. 1-36, Newport Beach, USA.

International Searching Authority, "Written Opinion of the International Searching Authority," PCT/CN2019/090989, Mar. 11, 2020, pp. 1-4.

* cited by examiner

METHOD AND APPARATUS FOR HANDLING CONNECTION WITH MULTI-SIM

TECHNICAL FIELD

The present disclosure generally relates to wireless communication technology, and more particularly to multi-Subscriber Identity Module technology in a wireless communication system.

BACKGROUND OF THE INVENTION

A subscriber identity module (SIM) (i.e., a SIM card) includes an integrated circuit with information for identifying and authenticating subscribers of a mobile device (e.g., a User Device or User Equipment (UE)) on a cellular network. In some circumstances, a user may need to use more than one SIM with a single device to be able to connect to multiple networks. In response to such need, multi-SIM technology has been developed.

In particular, based on the multi-SIM technology, a single user device can support more than one SIM with common radio and baseband components being shared among the multiple SIMs for the purpose of cost efficiency. However, such arrangements can lead to several issues that impact the performance of such device under different network architectures.

BRIEF SUMMARY OF THE INVENTION

One embodiment of the present disclosure provides a method of a user equipment. The method includes: communicating with a first base station by utilizing a first Subscriber Identity Module (SIM) and communicating with a second base station by utilizing a second SIM; transmitting a request signal to the second base station in response to a connection setup process between the user equipment and the first base station; and receiving a configuration message from the second base station in response to the request signal.

Another embodiment of the present disclosure provides an apparatus. The apparatus includes: a non-transitory computer-readable medium having computer-executable instructions stored thereon; two or more SIM receptors for receiving two or more SIMs; a transceiver circuitry; and a processor coupled to the non-transitory computer-readable medium, the transceiver circuitry and the two or more SIM receptors; wherein the computer executable instructions cause the processor to perform a method with the SIM receptors, the SIMs and the transceiver circuitry according to an embodiment of the present disclosure.

Yet another embodiment of the present disclosure provides a method of a base station. The method includes: receiving a request signal from a user equipment, wherein the user equipment is in a connected mode with the base station by utilizing an SIM; transmitting a configuration message to the user equipment in response to the request signal, wherein the configuration message indicates to the user equipment whether to switch from the connected mode to a suspension mode with the base station, or to release a connection with the base station.

Yet another embodiment of the present disclosure provides an apparatus. The apparatus includes: a non-transitory computer-readable medium having computer executable instructions stored therein; a transceiver circuitry; and a processor coupled to the non-transitory computer-readable medium and the transceiver circuitry; wherein the computer executable instructions cause the processor to perform a method with the transceiver circuitry according to an embodiment of the present disclosure.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION OF THE INVENTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
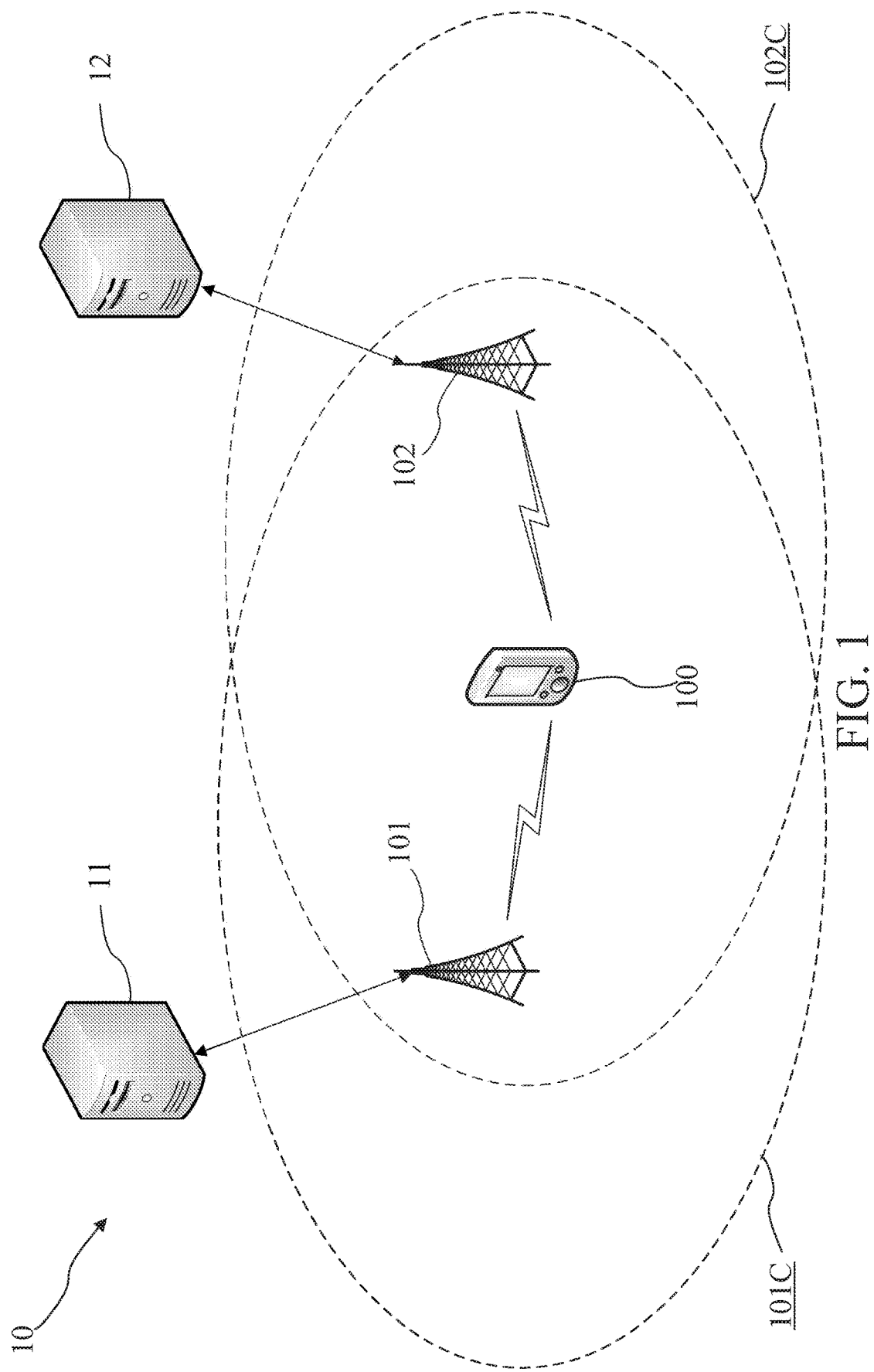
FIG. 1 illustrates a wireless communication system according to embodiments of the present disclosure.

Referring to FIG. 1, a wireless communication system 10 may include a user equipment (UE) 100, a first base station (BS) 101 and a second BS 102. Although, for simplicity, merely two BSs are illustrated in FIG. 1, it is contemplated that the wireless communication system 10 may also include more or fewer BSs in some other embodiments of the present disclosure. Although, for simplicity, merely one UE is illustrated in FIG. 1, it is also contemplated that the wireless communication system 10 may include more or fewer UEs in some other embodiments of the present disclosure.

The first BS 101, which communicates with a first Core Network (CN) 11, may operate or work under the control of a Mobility Management Entity (MME) (not illustrated in FIG. 1). The first CN 11 may include a Home Subscriber Server (HSS) (not illustrated in FIG. 1), which communicatively coupled with the MME. The BS 101 may operate, for example based on the standard protocol such as Long-Term Evolution (LTE), LTE-Advanced (LTE-A), New Radio (NR), or other suitable protocol(s). For example, the first BS 101 may include an eNB or a gNB, and may define one or more cells (e.g., cell 101C).

The second BS 102, which communicates with a second CN 12, may operate or work under the control of an MME (not illustrated in FIG. 1). The second CN 12 may include an HSS (not illustrated in FIG. 1), which is communicatively coupled with the MME. The second BS 102 may operate, for example, based on the standard protocol such as LTE, LTE-A, NR, or other suitable protocol(s). For example, the second BS 102 may include an eNB or a gNB, and may define one or more cells (e.g., cell 102C).

The UE 100 may represent, for example, but is not limited to, a computing device, a wearable device, a mobile device, an Internet of Things (IoT) device, etc. Persons skilled in the art should understand that as technology develops and advances, the terminologies described in the present disclosure may change, but should not affect or limit the principles and spirit of the present disclosure.

Figure 2:
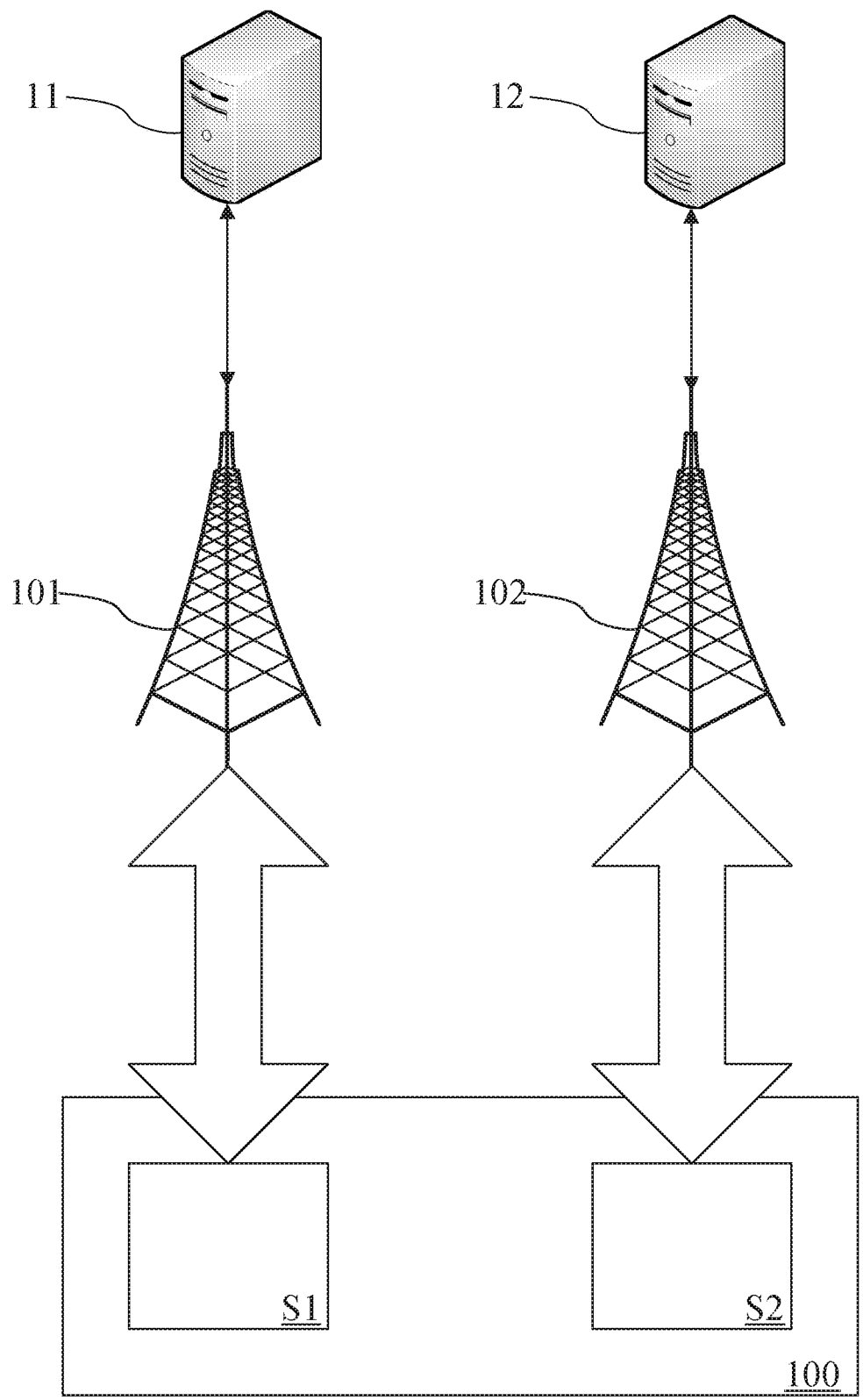
FIG. 2 is a schematic view of connection states between a user equipment and base stations according to embodiments of the present disclosure.

Referring to FIG. 2, the UE 100 may include a first SIM (i.e., a SIM card) S1 and a second SIM (i.e., SIM card) S2. As shown in FIG. 2, the UE 100 includes two SIM cards— the first SIM S1 and the second SIM S2, where the first SIM S1 of the UE 100 supports communication with the first BS 101 which, in turn, communicates with CN 11, and the second SIM S2 of the UE 100 supports communication to the second BS 102 which, in turn, communicates with the second CN 12. In particular, the UE 100 communicates with the first BS 101 based on the first SIM S1 and communicates with the second BS 102 based on the second SIM S2. More specifically, the UE 100 communicates with the first BS 101 by utilizing information stored on the first SIM S1 and communicates with the second BS 102 by utilizing information stored on the second SIM S2. Although, for simplicity, merely two SIMs are illustrated in FIG. 2, it is contemplated that UE 100 may also include more than two SIMs in some other embodiments of the present disclosure.

Figure 3:
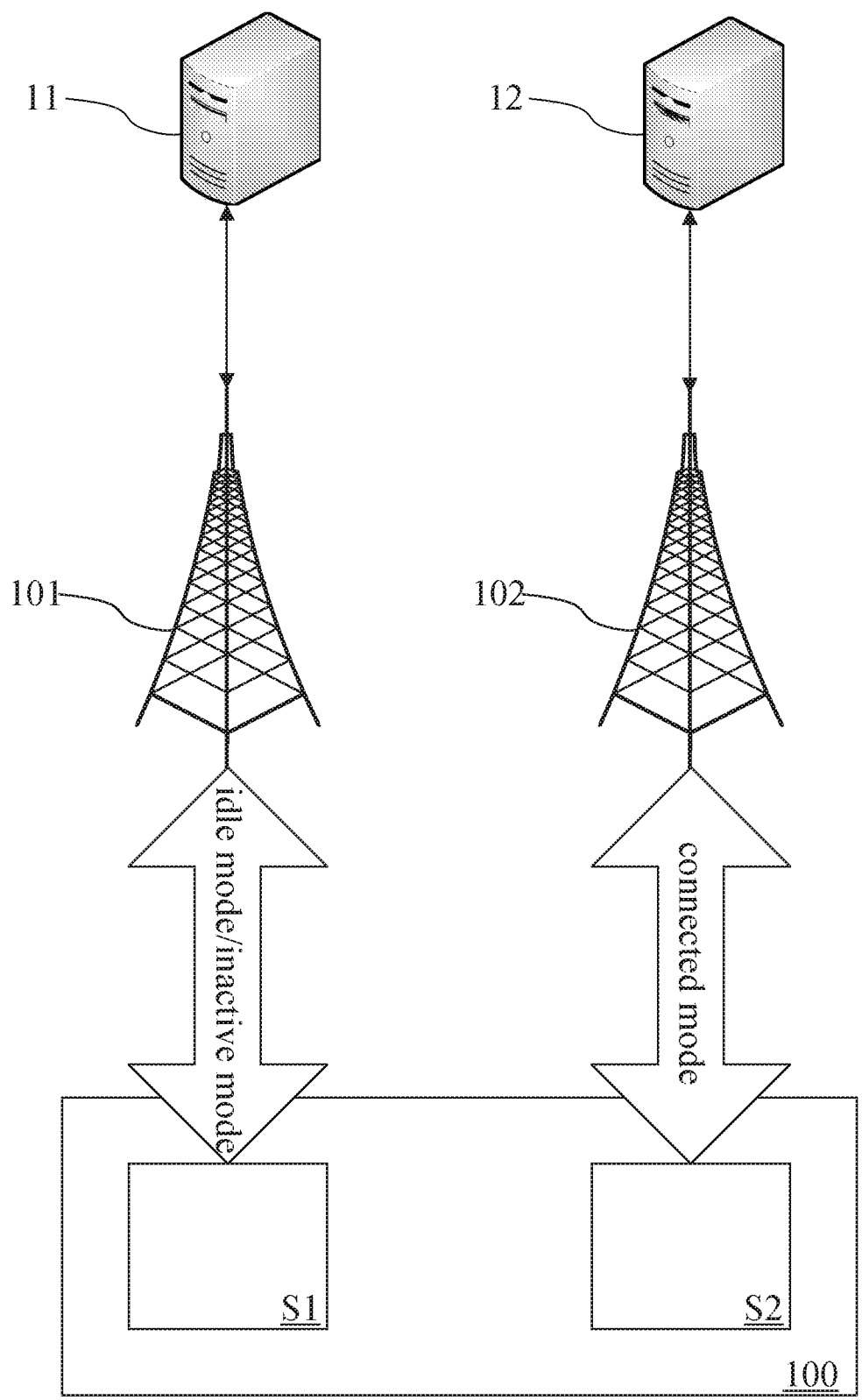
FIG. 3 is a schematic view of connection states between a user equipment and base stations according to embodiments of the present disclosure.

Referring to FIG. 3, in some embodiments, the UE 100 camps on the first BS 101 and is connected to the second BS 102. In detail, when the UE 100 camps on the first BS 101, it means that the UE 100 is in an idle or an inactive mode with respect to the first BS 101. And, when the UE 100 is being identified as connected to the second BS 102, it means that the UE 100 is in a connected mode with the second BS 102 while communication between the UE 100 and the second BS 102 is supported by the information contained in the second SIM S2.

Figure 4:
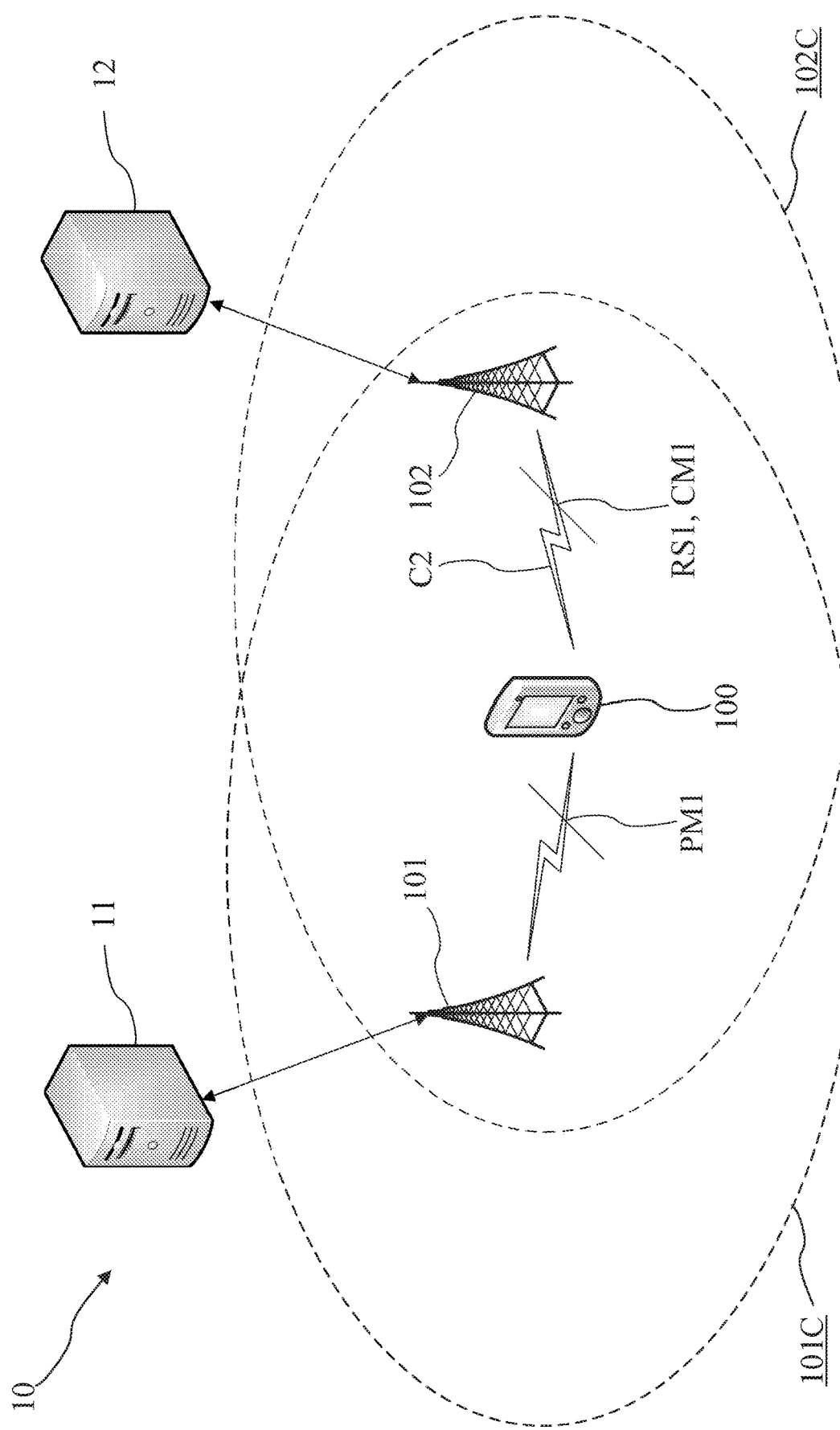
FIG. 4 illustrates a wireless communication system according to embodiments of the present disclosure.

Please refer to FIG. 4. Next, when a new connection setup process (not illustrated in FIG. 4), using the information stored on the first SIM S1, is triggered between UE 100 and the first BS 101, the UE 100 needs to inform the second BS 102 of the new connection setup process performed between the UE 100 and the first BS 100, since the connected mode supported between the UE 100 and the second BS 102 may be interrupted by the new connection setup process. In particular, in response to the new connection setup process between UE 100 and the first BS 101, UE 100 transmits a request signal RS1 to the second BS 102 for informing the second BS 102 of the new connection setup process between UE 100 and the first BS 101.

Accordingly, after receiving the request signal RS1, the second BS 102 may determine whether: (1) to suspend a connection C2 between the UE 100 and the second BS 102; or (2) to release the connection C2 between the UE 100 and the second. BS 102. Next, in response to the request signal RS1, the second BS 102 may transmit a configuration message CM1 to the UE 100 for configuring the UE 100 to suspend the connection C2 or to release the connection C2. Subsequently, after receiving the configuration message CM1, the UE 100 may suspend the connection C2 or release the connection C2 according to the configuration message CM1.

In some embodiments, the new connection setup process between the UE 100 and the first BS 101 may include an operation with the UE 100 performing registration with the first BS 101 by utilizing the information stored on the first SIM S1. Specifically, when the UE 100 is in idle mode with the first BS 101 and communication between the UE 100 and the first BS 101 is supported by the first SIM S1, the UE 100 may perform registration with the first BS 101 in the following cases: (a) the UE 100 periodically performs registration with the first BS 101 by utilizing the information stored on the first SIM S1; or (b) the UE 100 performs registration with the first BS 101 by utilizing the information stored on the first SIM S1 when UE 100 changes from a previous Tracking Area (TA) to a new TA.

More specifically, in the case where the UE 100 periodically performs the registration with the first BS 101 by utilizing the information stored on the first SIM S1, the UE 100 may still be within a registration area that includes the cell 101C. Accordingly, the UE 100 may periodically perform registration with the first BS 101 within the registration area for registering presence of the UE 100.

Further, in the case where the UE 100 performs registration with the first BS 101 by utilizing the information stored on the first SIM S1, when the UE 100 changes from the previous TA to the new TA, the UE 100 may move from the previous TA to the new TA, which includes the cell 1010. Accordingly, the UE 100 may be triggered to perform registration with the first BS 101 since the UE 100 has not been registered in the new IA.

Next, when a new connection setup process between the UE 100 and the first BS 101 includes an operation of performing registration with the first BS 101, the UE 100 transmits the request signal RS1 to the second BS 102, and the request signal RS1 includes an indicator of performing the registration with the first BS 101. After receiving the request signal RS1, the second BS 102 may determine whether to suspend connection C2 or to release connection C2 according to the indicator included as part of the request signal RS1. Next, the second BS 102 may transmit configuration message CM1 to the UE 100 for configuring the UE 100 to suspend connection C2 or to release connection C2. Subsequently, after receiving the configuration message CM1, the UE 100 may suspend the connection C2 or release the connection C2 according to the configuration message CM1.

In some embodiments, the new connection setup process between the UE 100 and the first BS 101 may include an operation where the UE 100 performs Radio Access Network (RAN)-based Notification Area Update (RNAU) procedure with the first BS 101 by utilizing the information stored on the first SIM S1. Specifically, when the UE 100 is in an inactive mode with the first BS 101 and communication between the UE 100 and the first BS 101 is supported by the first SIM S1, the UE 100 may perform the RNAU procedure in the following cases: (a) the UE 100 periodically performs the RNAU procedure with the first BS 101 by utilizing the information stored on the first SIM S1; or (b) the UE 100 performs the RNAU procedure with the first BS 101 by utilizing the information stored on the first SIM S1 when the UE 100 enters a cell which is an unconfigured RAN-based Notification Area (RNA) associated with the first SIM S1.

More specifically, in the case where the UE 100 periodically performs the RNAU procedure with the first BS 101 by utilizing the information stored on the first SIM S1, the UE 100 may still be within a configured RNA, which includes the cell 101C, associated with the first SIM S1. Accordingly, the UE 100 may periodically perform the RNAU procedure with the first BS 101 within the configured RNA.

Further, in the case where the UE 100 performs the RNAU procedure with the first BS 101 by utilizing the information stored on the first SIM S1, when the UE 100 enters an unconfigured RNA, the UE 100 may move from another configured RNA to the unconfigured RNA that includes the cell 101C. Accordingly, the UE 100 may be triggered to perform the RNAU procedure with the BS 101 since the UE 100 has not been registered in the unconfigured RNA.

Next, when the new connection setup process between the UE 100 and the first BS 101 includes the operation of performing the RNAU procedure with the first BS 101, the UE 100 transmits the request signal RS1 to the second BS 102, and the request signal RS1 includes an indicator of performing the RNAU procedure with the first BS 101. After receiving the request signal RS1, the second BS 102 may determine whether to suspend the connection C2 or to release the connection C2 according to the indicator included as part of the request signal RS1. Next, the second BS 102 may transmit the configuration message CM1 to the UE 100 for configuring the UE 100 to suspend the connection C2 or to release the connection C2. Subsequently, after receiving the configuration message CM1, the UE 100 may suspend the connection C2 or release the connection C2 according to the configuration message CM1.

In some embodiments, the new connection setup process between the UE 100 and the first BS 101 may include an operation of the UE 100 transmitting an uplink data to the first BS 101 by utilizing the information stored on the first SIM S1. In particular, when the UE 100 is in the idle mode or the inactive mode with the first BS 101 and communication between UE 100 and the first BS 101 is supported by the first SIM S1, the UE 100 may have the uplink data ready to be transmitted to the first BS 101 by utilizing the information stored on the first SIM S1. Accordingly, the TIE 100 transmits the request signal RS1 to the second BS 102 according to the uplink data arrival (i.e., the uplink data which is ready in the UE 100 to be transmitted), and the request signal RS1 includes an indicator of transmitting the uplink data to the first BS 101.

After receiving the request signal RS1, the second BS 102 may determine whether to suspend the connection C2 or to release the connection C2 according to the indicator included as part of the request signal RS1. Next, the second BS 102 may transmit the configuration message CM1 to the UE 100 for configuring the UE 100 to suspend the connection C2 or to release the connection C2. Subsequently, after receiving the configuration message CM1, the UE 100 may suspend the connection C2 or release the connection C2 according to the configuration message CM1.

In some embodiments, the request signal RS1 may include: (1) the indicator of transmitting the uplink data to the first. BS 101; (2) traffic priority information of the uplink data; (3) duration information of the uplink data; (4) an indicator of one-shot data to the first BS 101; or (5) any combination of (1) to (4). Accordingly, the second BS 102 may be informed of the uplink data transmission by the indicator of transmitting the uplink data, and the second BS 102 may determine whether to suspend the connection C2 or to release the connection C2 according to assisting information which includes the traffic priority information of the uplink data, the duration information of the uplink data or the indicator of one-shot data to the first BS 101. It should be noted that the one-shot data represents the data that can be transmitted within a short data transmission period, such as a single data transmission frame.

For example, when the traffic priority information (i.e., the traffic priority) of the uplink data is higher than traffic priority information (i.e., traffic priority) of the connection C2 and the duration information of the uplink data is not greater than a transmission time threshold, the second BS 102 determines to suspend the connection C2. When the traffic priority information of the uplink data is higher than the traffic priority information of the connection C2 and the duration information of the uplink data is greater than the transmission time threshold, the second BS 102 determines to release the connection C2. In some embodiments, when the traffic priority information of the uplink data is not higher than the traffic priority information of the connection C2, UE 100 does not transmit the request signal RS1 to the second BS 102.

For another example, when the indicator of one-shot data to the first BS 101 is included in the request signal RS1, it means that the uplink data is one-shot data which can be transmitted within a short period. Accordingly, the second BS 102 determines to suspend the connection C2 rather than releasing the connection C2.

In some embodiments, the UE 100 may receive a paging message PM1 from the first BS 101 and the paging message PM1 may be used for informing the UE 100 of transmission of downlink data. The new connection setup process between the UE 100 and the first BS 101 may include an operation of the UE 100 receiving the downlink data from the first BS 101. In particular, when the UE 100 is in the idle mode or the inactive mode with the first BS 101 and communication between the UE 100 and the first BS 101 is supported by the first SIM S1, the UE 100 may receive the paging message PM1 from the first BS 101. In other words, the UE 100 is informed of transmission of the downlink data from the first BS 101 by utilizing the information stored on the first SIM S1. Therefore, the UE 100 transmits the request signal RS1 to the second BS 102 in response to receiving the paging message PM1, and the request signal RS1 includes an indicator of receiving the downlink data from the first BS 101. More specifically, the indicator included in the request signal RS1 indicates to the second BS 102 the coining of receiving the downlink data from the first BS 101.

After receiving the request signal RS1, the second BS 102 may determine whether to suspend the connection C2 or to release the connection C2 according to the indicator included as part of the request signal RS1. Next, the second BS 102 may transmit the configuration message CM1 to the UE 100 for configuring the UE 100 to suspend the connection C2 or to release the connection C2. Subsequently, after receiving the configuration message CM1, the UE 100 may suspend the connection C2 or release the connection C2 according to the configuration message CM1.

In some embodiments, the paging message may include: (1) traffic priority information of the downlink data; (2) duration information of the downlink data; (3) an indicator of one-shot data from the first BS 101; or (4) any combination of (1) to (3). The request signal RS1 may include: (1) the indicator of receiving the downlink data from the first BS 101; (2) the traffic priority information of the downlink data;

(3) the duration information of the downlink data; (4) the indicator of one-shot data from the first BS 101; or (5) any combination of (1) to (4). Accordingly, the second BS 102 may be informed of the downlink data transmission by the indicator of receiving the downlink data, and the second BS 102 may determine to suspend the connection C2 or to release the connection C2 according to assisting information, which includes the traffic priority information of the downlink data, the duration information of the downlink data or the indicator of one-shot data from the first BS 101.

For example, when the traffic priority information (i.e., the traffic priority) of the downlink data is higher than traffic priority information (i.e., traffic priority) of the connection C2 and the duration information of the downlink data is not greater than a transmission time threshold, the second BS 102 determines to suspend the connection C2. When the traffic priority information of the uplink data is higher than the traffic priority information of the connection C2, and the duration information of the uplink data is greater than the transmission time threshold, the second. BS 102 determines to release the connection C2. In some embodiments, when the traffic priority information of the downlink data is not higher than the traffic priority information of the connection C2, UE 100 does not transmit the request signal to the second BS 102.

For another example, when the indicator of one-shot data from the first BS 101 is included in the paging message PM1, it means that the downlink data is one-shot data which can be transmitted within a short period. Next, the UE 100 transmits the request signal RS1, which includes the indicator of one-shot data from the first BS 101, to the second BS 102. Accordingly, the second BS 102 determines to suspend the connection C2 rather than releasing the connection C2.

In some embodiments, the UE 100 may receive the paging message PM1 using an autonomous gap. In detail, the UE 100 may transmit a multi-SIM indicator to the second BS 102, and the multi-SIM indicator may be included in a capability Information Element (IE). The multi-SIM indicator may be used for informing the second. BS 102 of a number of SIMs supported by the UE 100. When the second BS 102 is informed of that the UE 100 supports multi-SIM (i.e., two or more SIMs) according to the multi-SIM indicator, the second BS 102 may enable a function of the autonomous gap for the UE 100 to receive the paging message PM1. In other words, the second BS 102 may configure the UE 100 to enable the function of the autonomous gap.

When the function of the autonomous gap is enabled in the UE 100, the UE 100 may receive the paging message PM1 using the autonomous gap without communicating with the second BS 102. More specifically, when the function of the autonomous gap is enabled in the UE 100, the UE 100 may temporarily abort communication with the second BS 102 and create the autonomous gap to receive paging message within limited duration from the first BS 101. It should be noted that the autonomous gap is specified in 3GPP specification series TS 36, e.g., TS 36.133 and TS 36.331.

In some embodiments, the configuration message CM1 includes a first timer. When the UE 100 is configured to suspend the connection C2 by the configuration message CM1 from the second BS 102, the first timer starts. In detail, if the first timer expires, the UE 100 releases the connection C2 and switches to an idle mode with the second BS 102. If the connection C2 is resumed back to the connected mode before the first timer expires, the first timer stops. In some embodiments, the first timer may be initially configured in the UE 100.

In some embodiments, the configuration message CM1 includes an indicator of suspending the connection C2. For the aspect of control plane, when the connection C2 between the UE 100 and the second BS 102 is suspended, the UE 100 switches to a Radio Resource Control (RRC) inactive mode with the second BS 102. In addition, when the UE 100 remains in the RRC inactive mode with the second BS 102, the UE 100 performs a Radio Resource Management (RRM) procedure, which is associated with the RRC inactive mode, with the second BS 102. In other words, when the UE 100 remains in the RRC inactive mode with the second BS 102, the UE 100 follows the RRM procedure of the RRC inactive mode.

In some embodiments, the configuration message CM1 includes the indicator of suspending the connection C2 and a second timer. For the aspect of control plane, when the connection C2 between the UE 100 and the second BS 102 is suspended, the UE 100 remains in an RRC connected mode with the second BS 102 and starts the second timer. In addition, when UE 100 remains in the RRC connected mode with the second BS 102 and the second timer is still running (i.e., has not expired yet), UE 100 suspends an RRM procedure with the second BS 102. When the second timer expires, UE 100 releases the connection C2 and switches to an idle mode with the second BS 102.

In some embodiments, the configuration message CM1 includes the indicator of suspending the connection C2. For the aspect of user plane, some timers of different network layers may be suspended. For example, a Packet Data Convergence Protocol (PDCP) layer discard timer associated with the connection C2 between the UE 100 and the second BS 102 is suspended in response to the indicator of suspending the connection C2. A Radio Link Control (RLC) layer timer associated with the connection C2 between the UE 100 and the second BS 102 is suspended in response to the indicator of suspending the connection C2. The RLC timer may be a poll timer (e.g., t-PollRetransmit), a recording timer (e.g., t-Recording) or a prohibit timer t-StatusProhibit).

It should be noted that the PDCP layer discard timer may be used for timing the transmission of PDCP Service Data Unit (SDU). The poll timer may be used by the transmitting side of an Acknowledged Mode (AM) RLC entity in order to retransmit a poll. The recording tuner may be used by the receiving side of an AM RLC entity and the receiving side of an Unacknowledged Mode (UM) RLC entity in order to detect loss of RLC Protocol Data Units (PDUs) at the lower layer. The prohibit timer may be used by the receiving side of an AM RLC entity in order to prohibit transmission of a status PDU.

In some embodiments, the configuration message CM1 includes the indicator of suspending the connection C2. For the aspect of user plane, some Media Access Control (MAC) layer procedures associated with the connection C2 between the UE 100 and the second BS 102 may be suspended in response to receiving the configuration message CM1 including the indicator of suspending the connection C2.

For example, a Random Access (RA) procedure with the second BS 102 is suspended in response to receiving the configuration message CM1 including the indicator of suspending the connection C2. A Scheduling Request (SR) procedure with the second BS 102 is suspended in response to receiving the configuration message CM1 including the indicator of suspending the connection C2. A Buffer Status Report (BSR) procedure with the second BS 102 is suspended in response to receiving the configuration message CM1 including the indicator of suspending the connection C2. A configured grant with the second BS 102 is suspended in response to receiving the configuration message CM1 including the indicator of suspending the connection C2.

In some embodiments, the request signal RS1 may include an indication for indicating the second BS 102 to suspend the connection C2 between the UE 100 and the second BS 102, or for indicating the second BS 102 to release the connection C2 between the UE 100 and the second BS 102. In particular, the UE 100 may use the indication for suggesting the second BS 102 suspending the connection C2, or releasing the connection C2. Then, the second BS 102 may determine whether to suspend the connection C2 or to release the connection C2 based on the indication.

Figure 5:
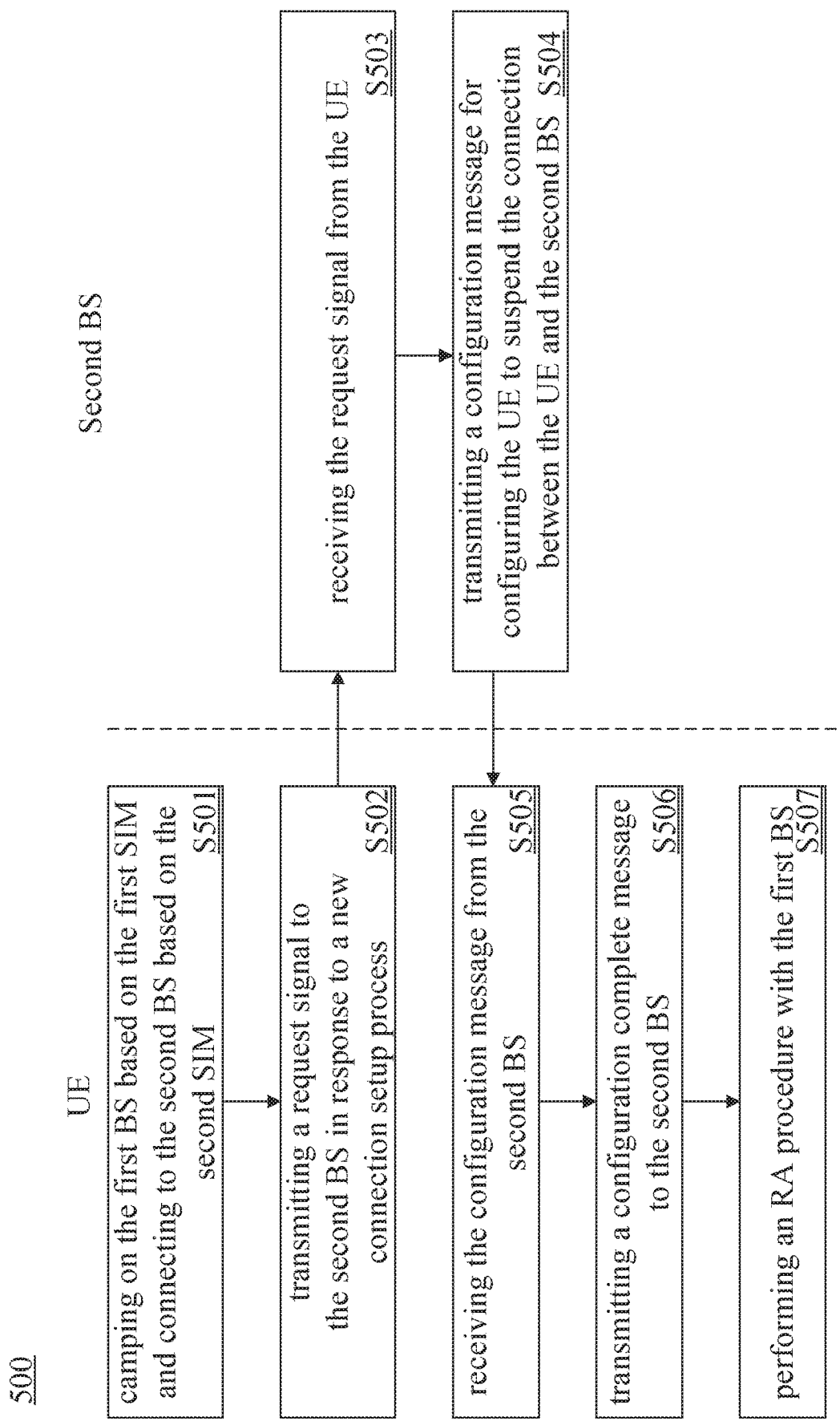
FIG. 5 is a flowchart according to embodiments of the present disclosure.

FIG. 5 illustrates a flowchart of a method for wireless communications in accordance with some embodiments of the present application. Referring to FIG. 5, the method 500 is performed by a UE (e.g., the UE 100) associated with a first BS (e.g., the first BS 101) and a second BS (e.g., the second BS 102) in some embodiments of the present application.

In operation S501, the UE camps on the first BS based on a first SIM (i.e., by utilizing information stored on the first SIM card) and connects to the second BS based on a second SIM (i.e., by utilizing information stored on the second SIM card). In some embodiments, the UE is in an idle mode or an inactive mode with the first BS and is in a connected mode with the second BS.

In some embodiments, a new connection setup process may be triggered between the UE and the first BS. The new connection setup process may include: (a) the UE periodically performing a registration with the first BS by utilizing the first SIM; or (b) the UE periodically performing an RNAU procedure with the first BS by utilizing the first SIM. In operation S502, the UE transmits a request signal to the second BS in response to the new connection setup process. In some embodiments, the request signal may include an indicator of: (a) the UE periodically performing the registration with the first BS by utilizing the first SIM; or (b) the UE periodically performing the RNAU procedure with the first BS by utilizing the first SIM. The request signal may further include an indication for indicating the second BS to suspend a connection between the UE and the second BS.

In operation S503, the second BS receives the request signal from the UE. After receiving the request signal, the second BS may determine to suspend the connection between the UE and the second BS. In operation S504, the second BS transmits a configuration message for configuring the UE to suspend the connection between the UE and the second BS.

In operation S505, the UE receives the configuration message from the second BS. After receiving the configuration message, the UE suspends the connection between the UE and the second BS according to the configuration message. In some embodiments, the configuration message may include a first timer. If the first timer expires, the UE may switch to an idle mode or an inactive mode with the second BS. In operation S506, the UE transmits a configuration complete message to the second BS. In operation S507, the UE performs an RA procedure with the first BS.

It should be noted that, after receiving the configuration message from the second BS in operation S505, the UE may perform different operations for control plane and the user plane.

As for the control plane, in some embodiments, the UE may switch to an RRC inactive mode with the second BS. In addition, when the UE remains in the RRC inactive mode with the second BS, the UE performs an RRM procedure, which is associated with the RRC inactive mode, with the second BS. In other words, when the UE remains in the RRC inactive mode with the second BS, the UE follows the RRM procedure of the RRC inactive mode.

As for the control plane, in some embodiments, the UE may switch to an RRC connected mode with the second BS and start a second timer. In addition, when the UE remains in the RRC connected mode and the second timer is still running (i.e., has not expired yet), the UE suspends an RRM procedure with the second BS. When the second timer expires, the UE releases the connection and switches to the idle mode or the inactive mode with the second BS.

As for the user plane, in some embodiments, the following timers may be suspended in response to suspending the connection between the UE and the second BS: (1) a PDCP layer discard timer associated with the connection between the UE and the second BS; and (2) an RLC layer timer associated with the connection between the UE and the second BS. In some embodiments, the RLC layer timer may be a poll timer (e.g., t-PollRetransmit), a recording timer (e.g., t-Recording) or a prohibit timer (e.g., t-StatusProhibit).

As for the user plane, in some embodiments, the following MAC layer procedures associated with the connection between the UE and the second BS, may be suspended in response to receiving the configuration message including the indicator of suspending the connection between the UE and the second BS: (1) an RA procedure with the second BS; (2) an SR procedure with the second BS; (3) a BSR procedure with the second BS; and (4) a configured grant with the second BS.

Figure 6:
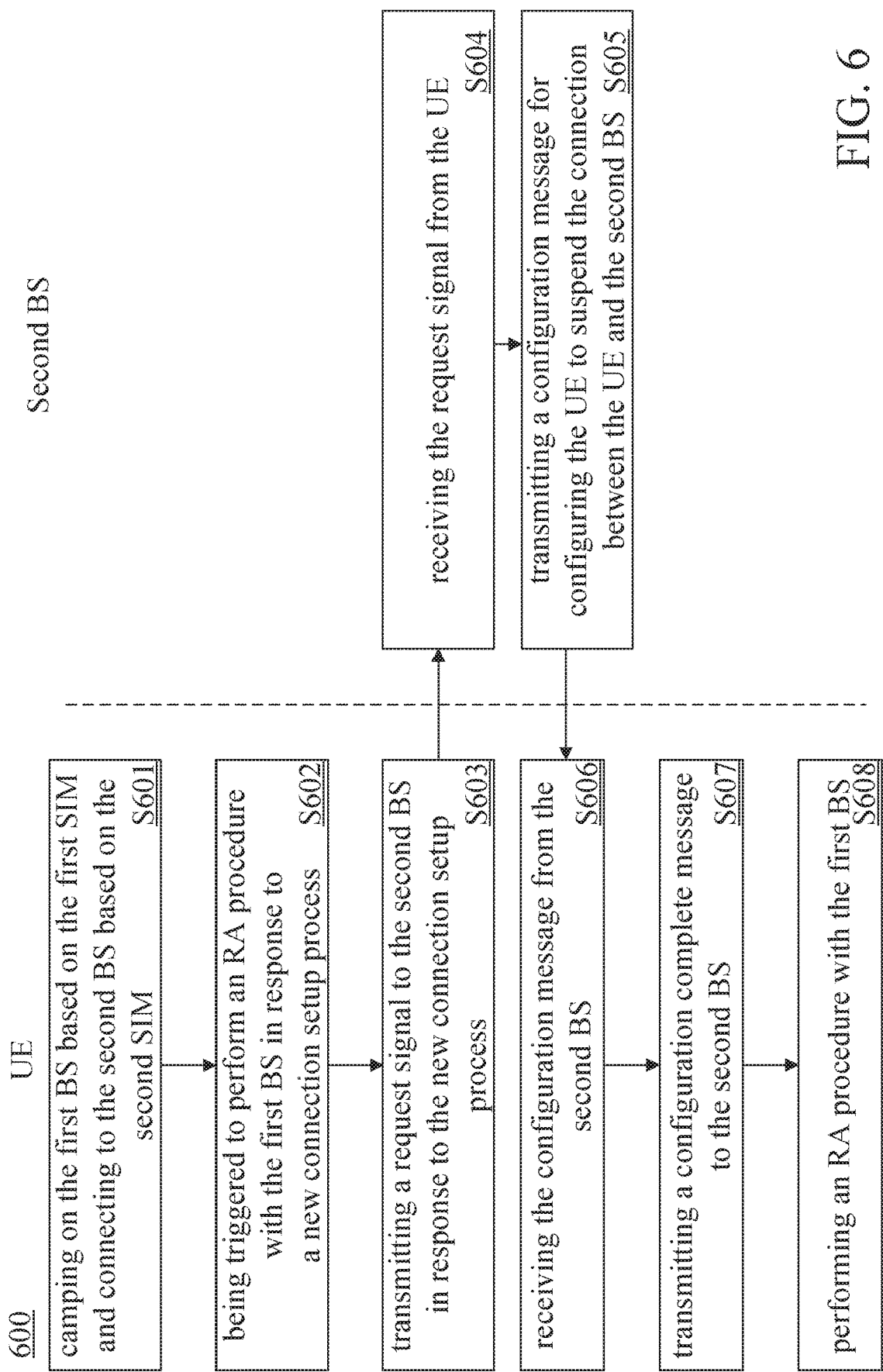
FIG. 6 is a flowchart according to embodiments of the present disclosure.

FIG. 6 illustrates a flowchart of a method for wireless communications in accordance with some embodiments of the present application. Referring to FIG. 6, the method 600 is performed by a UE (e.g., the UE 100) associated with a first BS (e.g., the first BS 101) and a second BS (e.g., the second BS 102) in some embodiments of the present application.

In operation S601, the UE camps on the first BS based on a first SIM (i.e., by utilizing information stored on the first SIM card) and connects to the second BS based on a second SIM (i.e., by utilizing information stored on the second SIM card). In some embodiments, the UE is in an idle mode or an inactive mode with the first BS and is in a connected mode with the second BS.

In some embodiments, a new connection setup process may be triggered between the UE and the first BS. The new connection setup process may include: (a) the UE performing the registration with the first BS by utilizing the first SIM when the UE changes from a previous TA to a new TA; or (b) the UE performing an RNAU procedure with the first BS by utilizing the first SIM when the UE enters a cell which is an unconfigured RNA associated with the first SIM. In operation S602, the UE is triggered to perform an RA procedure with the first BS by utilizing the first SIM in response to the new connection setup process between the UE and the first BS.

In operation S603, the UE transmits a request signal to the second BS in response to the new connection setup process. In some embodiments, the request signal may include an indicator of: (a) the UE performing the registration with the first BS by utilizing the first SIM when the UE changes from a previous TA to a new TA; or (b) the UE performing RNAU procedure with the first BS by utilizing the first SIM when the UE enters a cell which is an unconfigured RNA associated with the first SIM. The request signal may further include an indication for indicating the second BS to suspend a connection between the UE and the second BS.

In operation S604, the second BS receives the request signal from the UE. After receiving the request signal, the second BS may determine to suspend the connection between the UE and the second BS. In operation S605, the second BS transmits a configuration message for configuring the UE to suspend the connection between the UE and the second BS.

In operation S606, the UE receives the configuration message from the second. BS. After receiving the configuration message, the UE suspends the connection between the UE and the second BS according to the configuration message. In some embodiments, the configuration message may include a first timer. If the first timer expires, the UE may switch to an idle mode or an inactive mode with the second BS. In operation S607, the UE transmits a configuration complete message to the second BS. In operation S608, the UE performs an RA procedure with the first BS.

It should be noted that, after receiving the configuration message from the second BS in operation S606, the UE may perform different operations for the control plane and the user plane.

As for the control plane, in some embodiments, the UE may switch to an RRC inactive mode with the second BS. In addition, when the UE remains in the RRC inactive mode with the second BS, the UE performs an RRM procedure, which is associated with the RRC inactive mode, with the second BS. In other words, when the UE remains in the RRC inactive mode with the second BS, the UE follows the RRM procedure in the RRC inactive mode.

As for the control plane, in some embodiments, the UE may switch to an RRC connected mode with the second BS and start the second timer. In addition, when the UE remains in the RRC connected mode and the second timer is still running (i.e., has not expired yet), the UE suspends an RRM procedure with the second BS. When the second timer expires, the UE releases the connection and switches to the idle mode or the inactive mode with the second. BS.

As for the user plane, in some embodiments, the following timers may be suspended in response to suspending the connection between the UE and the second BS: (1) a PDCP layer discard timer associated with the connection between the UE and the second BS; and (2) an RLC layer timer associated with the connection between the UE and the second BS. In some embodiments, the RLC timer layer may be a poll timer (e.g., t-PollRetransmit), a recording timer (e.g., t-Recording) or a prohibit timer (e.g., t-StatusProhibit).

As for the user plane, in some embodiments, the following MAC layer procedures associated with the connection between the UE and the second BS, may be suspended in response to receiving the configuration message including the indicator of suspending the connection between the UE and the second BS: (1) an RA procedure with the second BS; (2) an SR procedure with the second BS; (3) a BSR procedure with the second BS; and (4) a configured grant with the second BS.

Figure 7:
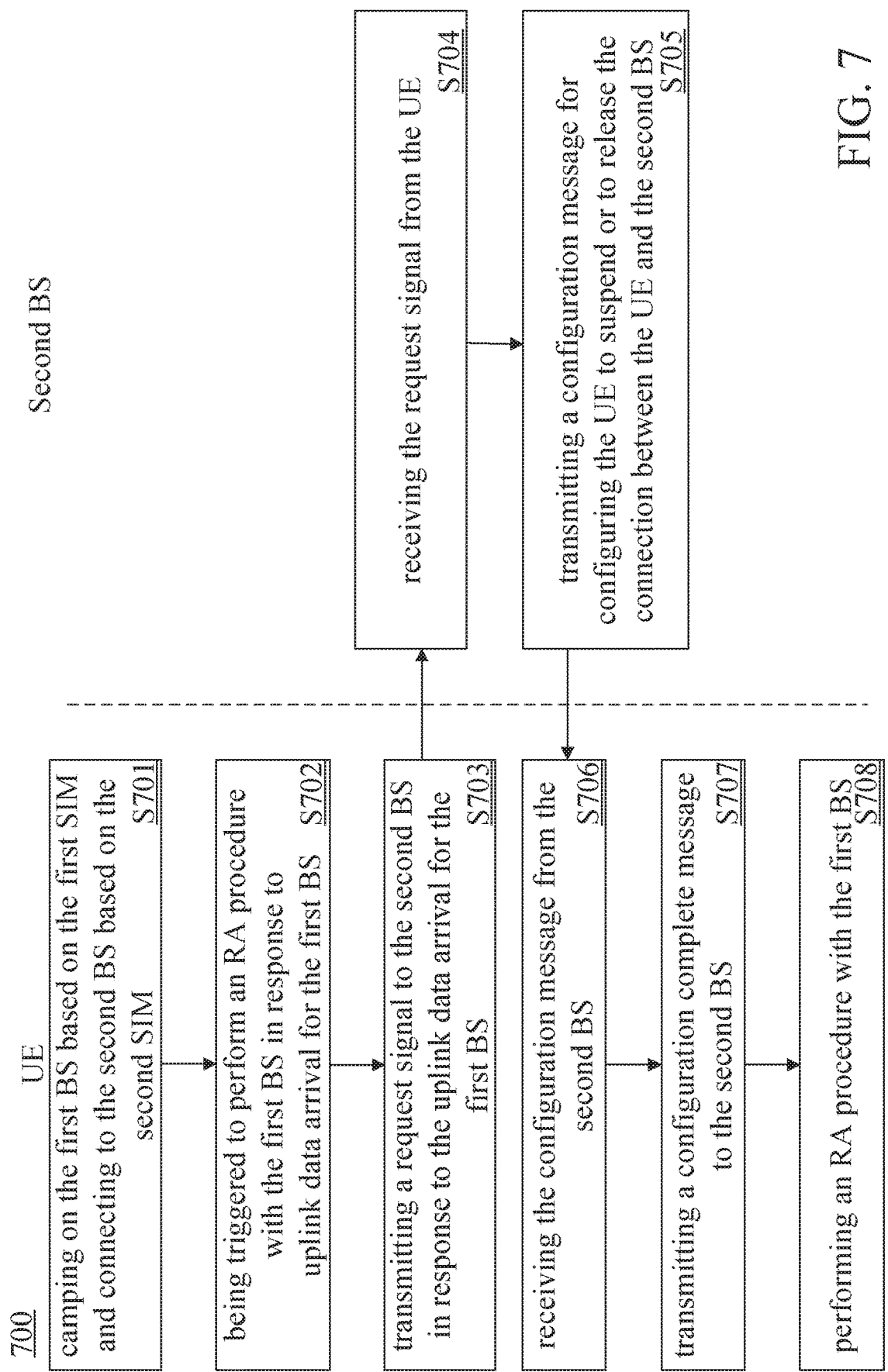
FIG. 7 is a flowchart according to embodiments of the present disclosure.

FIG. 7 illustrates a flowchart of a method for wireless communications in accordance with some embodiments of the present application. Referring to FIG. 7, the method 700 is performed by a UE (e.g., the UE 100) associated with a first BS (e.g., the first BS 101) and a second BS (e.g., the second BS 102) in some embodiments of the present application.

In operation S701, the UE camps on the first BS based on a first SIM (i.e., by utilizing information stored on the first SIM card) and connects to the second BS based on a second SIM (i.e., by utilizing information stored on the second SIM card). In some embodiments, the UE is in an idle mode or an inactive mode with the first BS and is in a connected mode with the second BS.

In some embodiments, a new connection setup process may be triggered between the UE and the first BS. The new connection setup process may include an operation of transmitting uplink data to the first BS by utilizing the first SIM. In operation S702, the UE is triggered to perform an RA procedure with the first BS by utilizing the first SIM in response to the uplink data arrival for the first BS.

In operation S703, the UE transmits a request signal to the second BS in response to the uplink data arrival for the first BS. In some embodiments, the request signal may include an indicator of transmitting uplink data to the first BS. The request signal may further include: traffic priority information of the uplink data; duration information of the uplink data; an indicator of one-shot data to the first BS; an indication for indicating the second BS to suspend or release a connection between the UE and the second BS; or any combination of such information.

In operation S704, the second BS receives the request signal from the UE. After receiving the request signal, the second BS may determine whether to suspend the connection between the UE and the second BS, or to release the connection between the UE and the second BS. In operation S705, the second BS transmits a configuration message for configuring the UE to suspend or to release the connection between the UE and the second BS.

In operation S706, the UE receives the configuration message from the second. BS. After receiving the configuration message, the UE suspends or releases the connection between the UE and the second BS according to the configuration message. In some embodiments, the configuration message may include a first timer. If the first timer expires, the UE may switch to an idle mode or an inactive mode with the second BS. In operation S707, the UE transmits a configuration complete message to the second BS. In operation S708, the UE performs an RA procedure with the first BS.

It should be noted that, after receiving the configuration message from the second BS in operation S706, the UE may perform different operations for the control plane and the user plane.

As for the control plane, in some embodiments, the UE may switch to an RRC inactive mode with the second BS. In addition, when the UE remains in the RRC inactive mode with the second BS, the UE performs an RRM procedure, which is associated with the RRC inactive mode, with the second BS. In other words, when the UE remains in the RRC inactive mode with the second BS, the UE follows the RRM procedure of the RRC inactive mode.

As for the control plane, in some embodiments, the UE may switch to an RRC connected mode with the second BS and start a second timer. In addition, when the UE remains in the RRC connected mode and the second timer is still running (i.e., has not expired yet), the UE suspends an RRM procedure with the second BS. When the second timer expires, the UE releases the connection and switches to the idle mode or the inactive mode with the second. BS.

As for the user plane, in some embodiments, the following timers may be suspended in response to suspending the connection between the UE and the second BS: (1) a PDCP layer discard timer associated with the connection between the UE and the second BS; and (2) a timer associated with the RLC layer which is with respect to the connection between the UE and the second BS. In some embodiments, the timer associated with the RLC layer may be a poll timer (e.g., t-PollRetransmit), a recording timer (e.g., t-Recording) or a prohibit timer (e.g., t-StatusProhibit).

As for the user plane, in some embodiments, the following MAC layer procedures associated with the connection between the UE and the second BS, may be suspended in response to receiving the configuration message including the indicator of suspending the connection between the UE and the second BS: (1) an RA procedure with the second BS; (2) an SR procedure with the second BS; (3) a BSR procedure with the second BS; and (4) a configured grant with the second BS.

Figure 8:
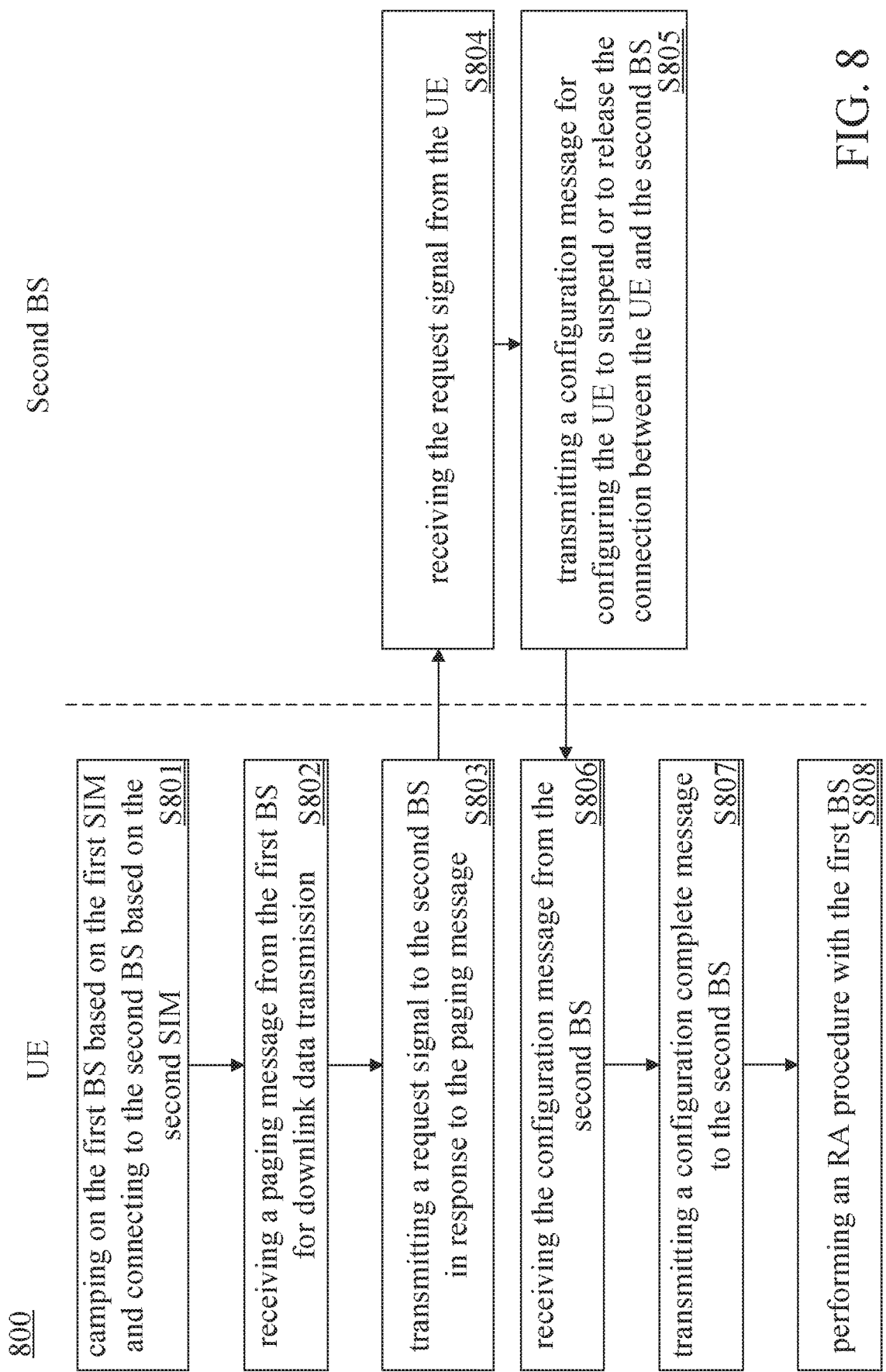
FIG. 8 is a flowchart according to embodiments of the present disclosure.

FIG. 8 illustrates a flowchart of a method for wireless communications in accordance with some embodiments of the present application. Referring to FIG. 8, the method 800 is performed by a UE (e.g., the UE 100) associated with a first BS (e.g., the first BS 101) and a second BS (e.g., the second BS 102) in some embodiments of the present application.

In operation S801, the UE camps on the first BS based on a first SIM (i.e., by utilizing information stored on the first SIM card) and connects to the second BS based on a second SIM (i.e., by utilizing information stored on the second SINI card). In some embodiments, the UE is in an idle mode or an inactive mode with the first BS and is in a connected mode with the second BS.

In operation S802, the UE receives a paging message from the first BS by utilizing the first SIM. The paging message may be used for informing the UE of transmission of downlink data from the first BS. In some embodiments, the UE may receive the paging message using an autonomous gap. In some embodiments, the paging message may include: traffic priority information of the downlink data; duration information of the downlink data; an indicator of one-shot data from the first BS; or any combination of such information.

In some embodiments, a new connection setup process may be triggered between the UE and the first BS in response to receiving the paging message. The new connection setup process may include an operation of receiving the downlink data from the first BS in response to the paging message.

In operation S803, the UE transmits a request signal to the second BS in response to the paging message which is used for informing the UE of the transmission of the downlink data from the first BS. In some embodiments, the request signal may include an indicator of receiving the downlink data from the first BS. More specifically, the indicator included in the request signal indicates to the second BS the coining of receiving the downlink data from the first BS.

The request signal may further include: the traffic priority information of the downlink data; duration information of the downlink data; the indicator of one-shot data from the first BS; an indication for indicating the second BS to suspend or release a connection between the UE and the second BS; or any combination of such information.

In operation S804, the second BS receives the request signal from the UE. After receiving the request signal, the second BS may determine whether to suspend the connection between the UE and the second BS, or to release the connection between the UE and the second BS. In operation S805, the second BS transmits a configuration message for configuring the UE to suspend or release the connection between the UE and the second BS.

In operation S806, the UE receives the configuration message from the second. BS. After receiving the configuration message, the UE suspends or releases the connection between the UE and the second BS according to the configuration message. In some embodiments, the configuration message may include a first timer. If the first timer expires, the UE may switch to an idle mode or an inactive mode with the second BS. In operation S807, the UE transmits a configuration complete message to the second BS. In operation S808, the UE performs an RA procedure with the first BS.

It should be noted that, after receiving the configuration message horn the second BS in operation S806, the UE may perform different operation for the control plane and the user plane.

As for the control plane, in some embodiments, the UE may switch to an RRC inactive mode with the second BS. In addition, when the UE remains in the RRC inactive mode with the second BS, the UE performs an RRM procedure, which is associated with the RRC inactive mode, with the second. BS. In other words, when the UE remains in the RRC inactive mode with the second BS, the UE follows the RRM procedure of the RRC inactive mode.

As for the control plane, in some embodiments, the UE may switch to an RRC connected mode with the second BS and start a second timer. In addition, when the UE remains in the RRC connected mode and the second timer is still running (i.e., has not expired yet), the UE suspends an RRM procedure with the second BS. When the second timer expires, the UE releases the connection and switches to the idle mode or the inactive mode with the second BS.

As for the user plane, in some embodiments, the following timers may be suspended in response to suspending the connection between the UE: and the second BS: (1) a PDCP layer discard timer associated with the connection between the UE and the second BS; and (2) an RLC layer tuner associated with the connection between the UE and the second BS. In some embodiments, the RLC layer timer may be a poll timer (e.g., t-PollRetransmit), a recording timer (e.g., t-Recording) or a prohibit timer (e.g., t-StatusProhibit).

As for the user plane, in some embodiments, the following MAC layer procedures associated with the connection between the UE and the second BS, may be suspended in response to receiving the configuration message including the indicator of suspending the connection between the UE and the second BS: (1) an RA procedure with the second BS; (2) an SR procedure with the second BS; (3) a BSR procedure with the second BS; and (4) a configured grant with the second BS.

Figure 9A:
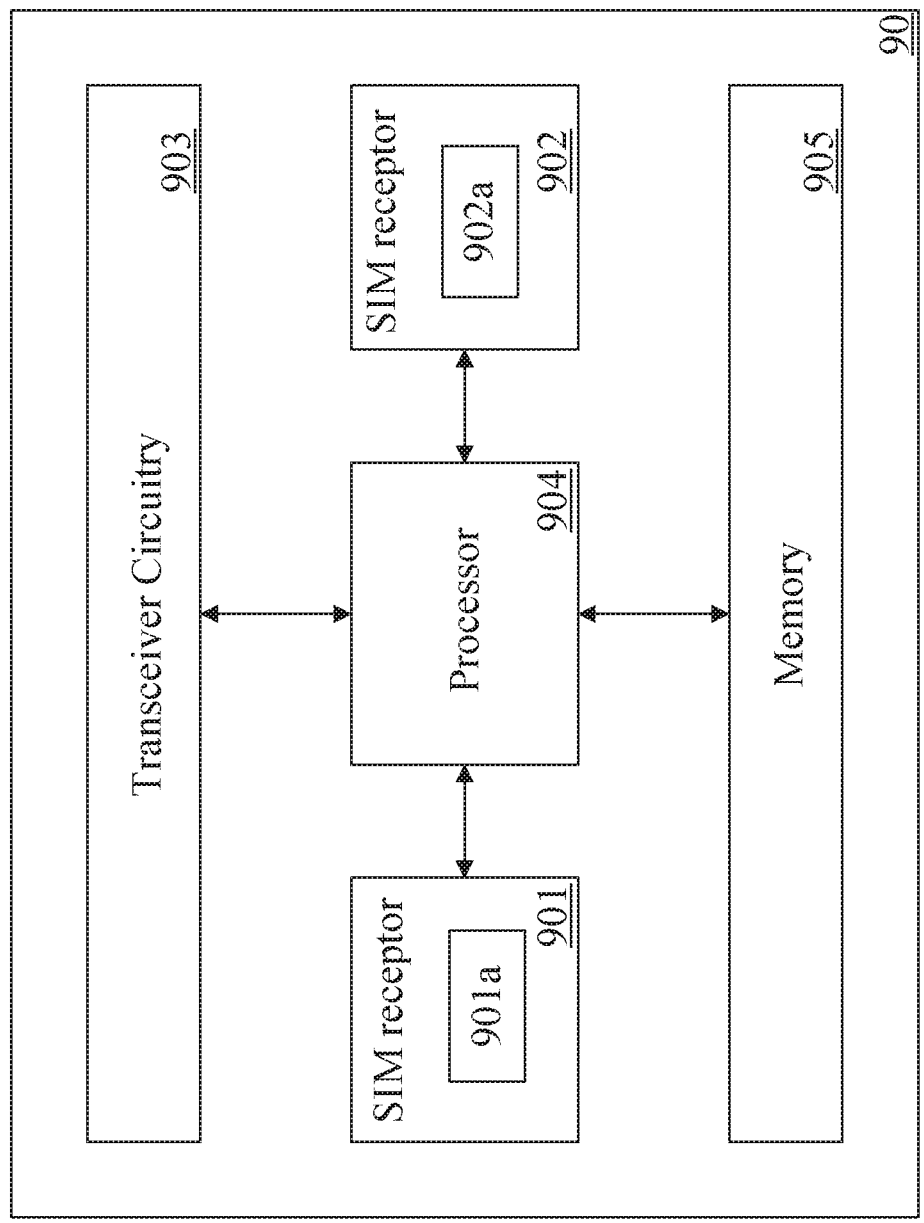
FIG. 9A illustrates an example block diagram of an apparatus according to embodiments of the present disclosure.
Figure 9B:
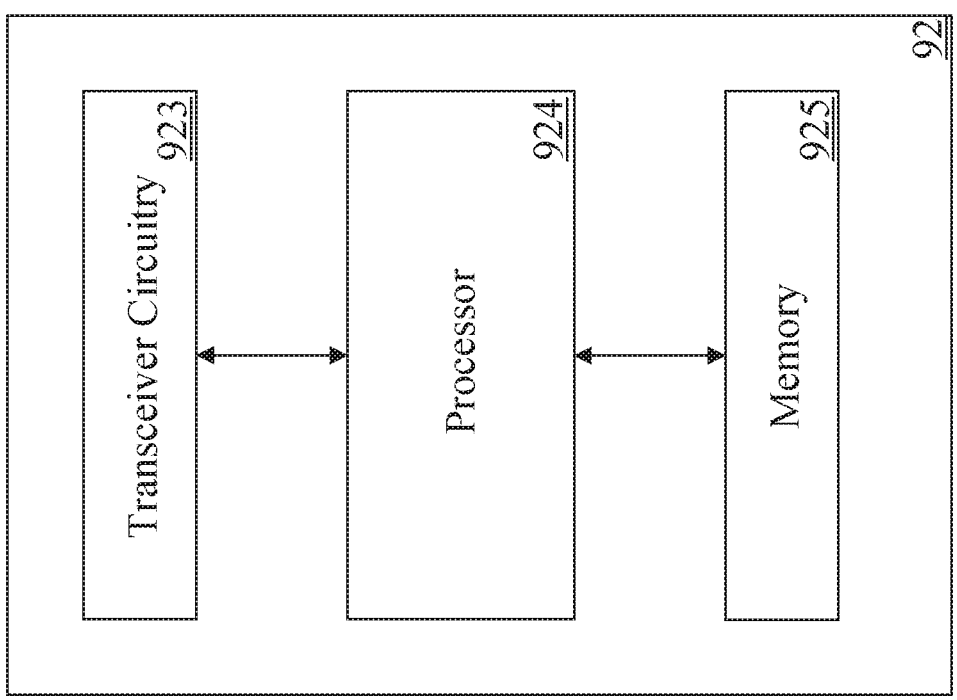
FIG. 9B illustrates an example block diagram of an apparatus according to embodiments of the present disclosure.

FIG. 9A illustrates an example block diagram of an apparatus 90 according to an embodiment of the present disclosure. FIG. 9B illustrates an example block diagram of an apparatus 92 according to an embodiment of the present disclosure.

As shown in FIG. 9A, the apparatus 90 may include a non-transitory computer-readable medium (not illustrated in FIG. 9A), two SIM receptors 901 and 902, a transceiver circuitry 903, a memory 905, and a processor 904 coupled to the non-transitory computer-readable medium (not illustrated in FIG. 9A), the SIM receptors 901 and 902, the transceiver circuitry 903, and the memory 905. The two SIM receptors 901 and 902 receive two SIMs 901a and 902a respectively. The apparatus 90 may be a user equipment.

Although in FIG. 9A, elements such as the processor 904, the transceiver circuitry 903, and the memory 905 are described in the singular, the plural is contemplated unless limitation to the singular is explicitly stated. In certain embodiments of the present disclosure, the apparatus 90 may further include an input device, and/or other components.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 904 to interact with the SIM receptors 901 and 902 (with the SIMs 901a and 902a), the transceiver circuitry 903 and the memory 905, so as to perform the operations with respect to the UE depicted in FIGS. 1 to 4.

As shown in FIG. 9B, the apparatus 92 may include a non-transitory computer-readable medium (not illustrated in FIG. 9B), a transceiver circuitry 923, a memory 925, and a processor 924 coupled to the non-transitory computer-readable medium (not illustrated in FIG. 9B), the transceiver circuitry 923, and the memory 925. The apparatus 92 may be a base station.

Although in FIG. 9B, elements such as the processor 924, the transceiver circuitry 923, and the memory 925 are described in the singular, the plural is contemplated unless limitation to the singular is explicitly stated. In certain embodiments of the present disclosure, the apparatus 92 may further include an input device, and/or other components.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 924 to interact with the transceiver circuitry 923 and the memory 925, so as to perform the operations with respect to the BS depicted in FIGS. 1 to 4.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

We claim:

1. A method performed by a user equipment (UE), the method comprising:
    camping on a first base station based on a first subscriber identity module and connecting to a second base station based on a second subscriber identity module;
    performing a connection setup process between the UE and the first base station based on the first subscriber identity module;
    transmitting a request signal associated with the connection setup process to the second base station in response to performing the connection setup process between the UE and the first base station, wherein the request signal comprises an indication for indicating the second base station to suspend or release a connection between the UE and the second base station; and
    receiving a configuration message from the second base station in response to transmitting the request signal.

2. The method of claim 1, wherein the UE is in an idle mode or an inactive with the first base station, and is in a connected mode with the second base station.

3. The method of claim 2, wherein the connection setup process further comprises:
    performing a registration with the first base station based on the first subscriber identity module;
    periodically performing the registration with the first base station based on the first subscriber identity module;
    in response to the UE changing to a new tracking area, the UE is triggered to perform the registration with the first base station based on the first subscriber identity module;
    performing a radio access network-based notification area update procedure with the first base station based on the first subscriber identity module;
    or a combination thereof.

4. The method of claim 3, wherein the request signal comprises:
    an indicator of performing the registration with the first base station;
    an indicator of performing the radio access network-based notification area update procedure with the first base station;
    or a combination thereof.

5. The method of claim 2, wherein the connection setup process further comprises transmitting uplink data to the first base station based on the first subscriber identity module.

6. The method of claim 5, wherein the request signal comprises:
    an indicator of transmitting uplink data to the first base station;
    traffic priority information of the uplink data and duration information of the uplink data;
    an indicator of one-shot data to the first base station;
    or a combination thereof.

7. The method of claim 2, further comprising:
    receiving a paging message from the first base station based on first subscriber identity module;
    wherein the connection setup process further comprises:

receiving downlink data from the first base station in response to the paging message.

8. The method of claim 7, wherein the request signal comprises an indicator of receiving downlink data from the first base station.

9. The method of claim 7, wherein the paging message comprises traffic priority information of the downlink data.

10. The method of claim 9, wherein the request signal comprises the traffic priority information of the downlink data.

11. The method of claim 7, wherein the paging message comprises an indicator of one-shot data from the first base station.

12. The method of claim 11, wherein the request signal comprises the indicator of one-shot data from the first base station.

13. The method of claim 2, wherein the configuration message comprises an indicator of suspending a connection between the UE and the second base station, or releasing the connection between the UE and the second base station.

14. The method of claim 13, wherein:
the configuration message comprises the indicator of suspending the connection and a timer, and the method further comprises suspending a radio resource management procedure which is associated with a radio resource control inactive mode, with the second base station while the timer is running;
the method further comprises switching to an idle mode with the second base station when the timer expires;
or a combination thereof.

15. The method of claim 13, wherein the configuration message comprises the indicator of suspending the connection, and the method further comprises:
suspending a random access procedure with the second base station in response to receiving the configuration message including the indicator of suspending the connection;
suspending a scheduling request procedure with the second base station in response to receiving the configuration message including the indicator of suspending the connection;
suspending a buffer status report procedure with the second base station in response to receiving the configuration message including the indicator of suspending the connection;
suspending a configured grant with the second base station in response to receiving the configuration message including the indicator of suspending the connection;
or a combination thereof.

16. A user equipment (UE), comprising:
at least one memory; and
at least one processor coupled with the at least one memory and configured to cause the UE to:
camp on a first base station based on a first subscriber identity module and connects to a second base station based on a second subscriber identity module;
perform a connection setup process between the UE and the first base station based on the first subscriber identity module;
transmit a request signal associated with the connection setup process to the second base station in response to performing the connection setup process between the UE and the first base station, wherein the request signal comprises an indication for indicating the second base station to suspend or release a connection between the UE and the second base station; and
receive a configuration message from the second base station in response to transmitting the request signal.

* * * * *